US012380592B2

(12) United States Patent
Wada et al.

(10) Patent No.: US 12,380,592 B2
(45) Date of Patent: Aug. 5, 2025

(54) IMAGE PROCESSING SYSTEM AND METHOD

(71) Applicant: Imperial College Innovations Limited, London (GB)

(72) Inventors: Kentaro Wada, London (GB); Edgar Antonio Sucar Escamilla, London (GB); Stephen Lloyd James, London (GB); Daniel James Lenton, London (GB); Andrew Davison, London (GB)

(73) Assignee: Imperial College Innovations Limited, London (GB)

( * ) Notice: Subject to any disclaimer, the term of this patent is extended or adjusted under 35 U.S.C. 154(b) by 413 days.

(21) Appl. No.: 17/943,963

(22) Filed: Sep. 13, 2022

(65) Prior Publication Data

US 2023/0019499 A1    Jan. 19, 2023

Related U.S. Application Data

(63) Continuation of application No. PCT/GB2021/050771, filed on Mar. 29, 2021.

(30) Foreign Application Priority Data

Mar. 31, 2020  (GB) ..................................... 2004672

(51) Int. Cl.
    *G06K 9/00*    (2022.01)
    *G06T 7/11*    (2017.01)
    (Continued)

(52) U.S. Cl.
    CPC .................. *G06T 7/70* (2017.01); *G06T 7/11* (2017.01); *G06T 17/10* (2013.01); *G06V 10/44* (2022.01);
    (Continued)

(58) Field of Classification Search
    CPC ...... G06T 2200/04; G06T 2207/10028; G06V 10/761
    See application file for complete search history.

(56) References Cited

U.S. PATENT DOCUMENTS 10,403,037 B1 *  9/2019  Boardman ............. G06V 10/17
2014/0254875 A1   9/2014  Alahi et al.
(Continued)

FOREIGN PATENT DOCUMENTS

WO    2014043353 A2    3/2014
WO    2019099095 A1    5/2019
WO    2020035661 A1    2/2020

OTHER PUBLICATIONS

International Search Report and Written Opinion dated Jul. 2, 2021 for PCT Application No. PCT/GB2021/050771.
(Continued)

*Primary Examiner* — Hadi Akhavannik
(74) *Attorney, Agent, or Firm* — EIP US LLP

(57) ABSTRACT

A computer-implemented method of determining a pose of each of a plurality of objects includes, for each given object: using image data and associated depth information to estimate a pose of the given object. The method includes iteratively updating the estimated poses by: sampling, for each given object, a plurality of points from a predetermined model of the given object transformed in accordance with the estimated pose of the given object; determining first occupancy data for each given object dependent on positions of the points sampled from the predetermined model, relative to a voxel grid containing the given object; determining second occupancy data for each given object dependent on positions of the points sampled from the predetermined models of the other objects, relative to the voxel grid containing the given object; and updating the estimated
(Continued)

poses of the plurality of objects to reduce an occupancy penalty.

18 Claims, 9 Drawing Sheets

(51) Int. Cl.
    *G06T 7/70*     (2017.01)
    *G06T 17/10*     (2006.01)
    *G06V 10/44*     (2022.01)
    *G06V 10/74*     (2022.01)

(52) U.S. Cl.
    CPC .. *G06V 10/761* (2022.01); *G06T 2207/10028* (2013.01)

(56) References Cited

U.S. PATENT DOCUMENTS

| 2015/0350608 A1* | 12/2015 | Winter | G06T 7/20 382/103 |
| 2016/0275686 A1* | 9/2016 | Zach | G06V 20/64 |
| 2020/0202608 A1* | 6/2020 | Mekuria | H04L 65/80 |
| 2022/0254045 A1* | 8/2022 | Boardman | H04N 23/695 |

OTHER PUBLICATIONS

United Kingdom Search Report dated Sep. 28, 2020 for GB Application No. GB2004672.8.

Wang et al. "DenseFusion: 6D Object Pose Estimation by Iterative Dense Fusion", 2019 IEEE/CVF Conference on Computer Vision and Pattern Recognition (CVPR) IEEE, Jun. 15, 2019 (Jun. 15, 2019), pp. 3338-3347.

McCormac et al., "Fusion++: Volumetric Object-Level SLAM", Aug. 25, 2018 (Aug. 25, 2018), arxiv.org, Cornell University Library, 201 Olin Library Cornell University Ithaca, NY 14853.

Xu et al., "MID-Fusion: Octree-based Object-Level Multi-Instance Dynamic SLAM", May 20, 2019 (May 20, 2019), 2019 International Conference On Robotics and Automation (ICRA), IEEE, pp. 5231-5237.

He et al., "Mask R-CNN" (arXiv:1703.06870), Jan. 24, 2018.

* cited by examiner

IMAGE PROCESSING SYSTEM AND METHOD

CROSS-REFERENCE TO RELATED APPLICATIONS

This application is a continuation of International Application No. PCT/GB2021/050771, filed Mar. 29, 2021, under 35 U.S.C. § 120, which claims priority to GB Application No. GB 2004672.8, filed Mar. 31, 2020, under 35 U.S.C. § 119(a). Each of the above referenced patent applications is incorporated by reference in its entirety.

BACKGROUND

Field of the Invention

The present invention relates to processing image data and associated depth information to determine poses of objects in a three-dimensional scene.

Description of the Related Technology

In situations where a robot is used to manipulate or otherwise interact with physical objects in an environment, it is important for the robot to determine precisely the positions and orientations of the physical objects relative to a given co-ordinate system. This task referred to as pose prediction. Pose prediction is relevant for a number of other fields, for example in automated diving systems (ADS) for automated vehicles or advanced driver assistance systems (ADAS), where the knowing pose of an entity such as a vehicle or pedestrian is useful for predicting how that entity will behave.

Some of the earliest examples of methods for pose prediction are template-based methods, in which templates of an object are derived from images taken from different viewpoints during an offline training stage, then scanned across an image containing the object at test time to find a best match according to a predetermined distance metric. Further examples include sparse feature-based methods, in which scale-invariant points of interest are extracted from images of an object at training time and associated with local descriptors such as SIFT or SURF. The local descriptors are matched to an image containing the object at test time using a method such as RANSAC.

Recent advances in sensor technology, including for example stereoscopic cameras, infrared cameras, sound navigation ranging (sonar), and light detection and ranging (LIDAR) systems, allow for accurate depth information to be captured alongside conventional two-dimensional images, for example resulting in the RGB-D image format. This depth information is leveraged by certain pose prediction methods for improved accuracy. Examples include dense methods in which a three-dimensional point cloud for an object is constructed at test time and then matched to a stored model of the object using an algorithm such as Iterative Closest Point (ICP). Further examples include hybrid methods which simultaneously process point cloud information using a neural network and RGB image data using a convolutional neural network (CNN), then fuse the outputs of the networks to derive pixel-wise dense feature embeddings which can be used for pose estimation.

In cases where multiple objects in an environment are in contact with one another, or where some of the objects are partially occluded, the accuracy of pose prediction using any of the above methods is typically reduced. In the case of robotics applications, this reduced accuracy can impair the performance of the robot, particularly in cluttered or otherwise densely populated environments.

SUMMARY

According to a first aspect, there is provided a computer-implemented method of determining a pose of each of a plurality of objects in a three-dimensional scene. The method includes, for each given object of the plurality of objects, obtaining image data and associated depth information representing a view of the three-dimensional scene in which at least a part of the given object is visible, and processing the image data and the associated depth information to estimate a pose of the given object. The method further includes iteratively updating the estimated poses of the plurality of objects, wherein the updating comprises: sampling, for each given object of the plurality of objects, a plurality of points from a predetermined model of the given object transformed in accordance with the estimated pose of the given object; determining respective first occupancy data for each given object of the plurality of objects dependent on positions of the points sampled from the predetermined model of the given object, relative to a voxel grid containing the given object; determining respective second occupancy data for each given object of the plurality of objects dependent on positions of the points sampled from the predetermined models of the other objects of the plurality of objects, relative to the voxel grid containing the given object; and updating the estimated poses of the plurality of objects to reduce an occupancy penalty depending on the respective first occupancy data and the respective second occupancy data for each of the plurality of objects.

Defining the occupancy penalty using first and second occupancy data which depend on the positions of points sampled from the predetermined models of the target objects allows for incremental updating of the estimated poses of the target objects to avoid physically unrealistic predictions in which two or more of the objects intersect with one another.

In examples, updating the estimated poses of the plurality of objects includes determining a gradient of the occupancy penalty with respect to the estimated poses of the plurality of objects, and updating the estimated poses of the plurality of objects using the determined gradient of the occupancy penalty. Updating the estimated poses using the gradient of the occupancy penalty allows for the configuration of object poses to be optimised more efficiently than for other possible methods, such as search-based methods.

In examples, the first occupancy data for each given object is dependent on minimum distances between voxels of the voxel grid containing the given object and the points sampled from the predetermined model of the given object; and the second occupancy data for each given object is dependent on minimum distances between voxels of the voxel grid containing the given object and the points sampled from the predetermined models of the other objects of the plurality of objects.

In some examples in which the first and second occupancy data are dependent on minimum distances, the dependences on the minimum distances saturate at a predetermined distance threshold. In this way, if no point is closer to the voxel than the predetermined distance threshold, that voxel does not contribute to the occupancy penalty, preventing apparent "action at a distance" between objects, which could otherwise cause objects to move away from one another during the updating of the object poses, even if the objects were not intersecting with one another.

In some examples in which the first and second occupancy data are dependent on minimum distances, the occupancy penalty includes a collision component for each given object of the plurality of object which increases when a point sampled from the predetermined model of the given object and a point sampled from the predetermined model of a different object are simultaneously brought closer to a voxel of the voxel grid containing the given object.

In examples, the method includes processing the image data and the associated depth information to generate a volumetric reconstruction for each given object of the plurality of objects.

In some examples in which the method includes generating a volumetric reconstruction for each given object, the method includes generating, using the generated volumetric reconstructions, third occupancy data indicating portions of the voxel grid containing the given object which are occupied by free space and portions of the voxel grid containing the given object which are occupied by objects other than the given object.

In some examples in which the occupancy penalty includes a collision component for each given object of the plurality of given objects, the collision component for a given object increases when a point sampled from the predetermined model of the given object is brought closer to a voxel of the voxel grid containing the given object which is occupied by free space or by objects other than the given object. This can result in more accurate poses being predicted, because the pose of each object is penalised if it would result in the object occupying a region of the scene which is known to be impenetrable.

In some examples, estimating the pose of each given object includes determining the estimated pose of the target object using the generated third occupancy data and pointwise feature data for a plurality of points on the surface of the given object. By using a combination of pointwise feature data for points on the surface of the given object with occupancy data indicating surrounding regions occupied free space and other objects, the estimated pose is made dependent on detailed visual information relating to the given object, whilst also taking into account information relating to the surroundings of the given object. As a result, the accuracy of pose estimation is improved, especially in cluttered or densely populated scenes.

In some examples, the occupancy penalty includes a surface alignment component for each given object of the plurality of objects which decreases when a point sampled from the predetermined model of the given object is brought closer to a voxel of the voxel grid containing the given object which is occupied by the volumetric reconstruction for the given object. The surface alignment component encourages consistency between the estimated pose of the given object and the appearance of the given object in the image and associated depth information.

In some examples, the view of the three-dimensional scene is a first view of the three-dimensional scene and the determined pose of each given object is a first pose of the given object. The method further includes: obtaining further image data and further associated depth information representing a second view of the three-dimensional scene different to the first view of the three-dimensional scene; and for each given object of the plurality of objects: processing the further image data and the further associated depth information to determine a second pose for the given object; transforming at least one of the first pose and the second pose of the given object to determine pose comparison data; processing the pose comparison data to determine whether a consistency condition is met; and when the consistency condition is determined to be met, generating a predetermined object model for the given object transformed consistently with the first pose and the second pose of the given object.

By capturing different views of the scene and comparing pose predictions resulting from different views, erroneous pose predictions, for example resulting from occlusion, can be identified and discarded. Once multiple pose estimates from different views are found to satisfy the consistency condition, an object model is spawned, which can be used for example by a robot interacting with the scene, or can be displayed for a human user. Furthermore, by capturing multiple views, a volumetric map of the scene can be built up iteratively using information from the different views, with the volumetric map containing fewer and fewer voxels in an "unknown" state as more views are captured. As a result, later pose predictions (which may use information from multiple views) may be more accurate than the initial pose predictions (which only use information from a single view).

In examples, the method includes generating the predetermined model of each given object of the plurality of objects from a respective computer-aided design (CAD) model. CAD modelling is a ubiquitous and highly optimised for generating mesh models of objects. In examples, the generated predetermined model is a solid model including internal structure as well as surface structure, allowing for points to be sampled from throughout the volume of the predetermined model. In this way, the resulting occupancy penalty can be used to more accurately determine poses which minimise unrealistic overlaps between objects in the scene.

According to a second aspect, there is provided an image processing system comprising a one or more sensors operable to capture image data and associated depth information. The system is arranged to, for each given object of a plurality of objects in the three-dimensional scene: capture, using the one or more sensors, image data and associated depth information representing a view of the three-dimensional scene in which at least a part of the given object is visible; and process the image data and the associated depth information to estimate a pose for the given object. The system is further arranged to iteratively update the estimated poses of the plurality of objects, wherein the updating includes: sampling, for each given object of the plurality of objects, a plurality of points from a predetermined model of the given object transformed in accordance with the estimated pose of the given object; determining respective first occupancy data for each given object of the plurality of objects dependent on positions of the points sampled from the predetermined model of the given object, relative to a voxel grid containing the given object; determining respective second occupancy data for each given object of the plurality of objects dependent on positions of the points sampled from the predetermined models of the other objects of the plurality of objects, relative to the voxel grid containing the given object; and updating the estimated poses of the plurality of objects to reduce an occupancy penalty depending on the respective first occupancy data and the respective second occupancy data for each of the plurality of objects.

In examples, the system includes engaging means for engaging a given object of the plurality of objects in dependence on the determined pose of the given object.

Engaging means can include one or more robotic hands or other components for grabbing, pushing, or otherwise physically contacting the target object. By engaging the target object in dependence on a pose estimated as described above, the system is able to perform intricate or sensitive tasks in a precise manner with minimal lag being introduced by the pose estimation method. In further examples, a system can interact with a target object without directly contacting the target object.

According to a third aspect, there is provided a computer program product including machine-readable instructions which, when executed by a computing system, cause the computing system to perform any of the methods described above.

Further features and advantages of the invention will become apparent from the following description of preferred embodiments of the invention, given by way of example only, which is made with reference to the accompanying drawings.

DETAILED DESCRIPTION

Figure 1:
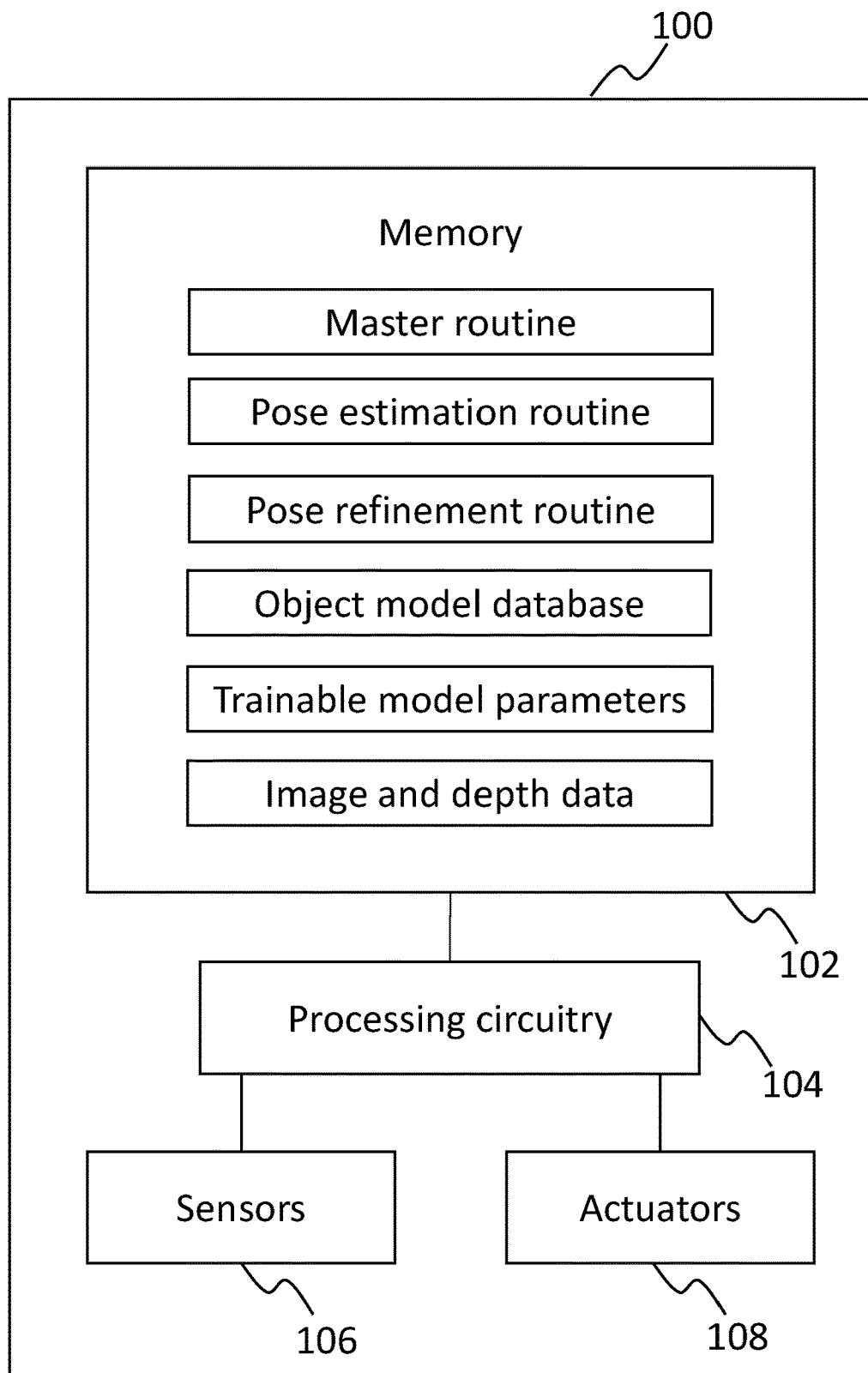
FIG. 1 is a schematic block diagram showing a system arranged to perform methods in accordance with examples.

FIG. 1 shows an example of a system 100 arranged to perform methods in accordance with the present disclosure. The system 100 includes memory 102 and processing circuitry 104, where the memory 102 is arranged to store data and routines for performing the methods described herein. The processing circuitry 104 is configured to execute the routines stored in the memory circuitry 102. The processing circuitry 104 is further arranged to control sensors 106 for capturing image data and associated depth information, and one or more actuators 108 arranged to move the sensors 106.

The memory 102 in this example holds a master routine, a pose estimation routine and a pose refinement routine, along with various other routines (not shown) in the form of machine-readable instructions. In a particular configuration, execution of the master routine causes the pose estimation routine to be executed followed by the pose refinement routine, as will be described in more detail hereafter. The memory 102 further includes trainable model parameters for various trainable models used during execution of the pose estimation routine.

The memory 102 is arranged to hold image data and associated depth information captured by the sensors 106. In this example, the memory 102 is arranged to store image data and associated depth information in red green blue-depth (RGB-D) format, though the system 100 can be configured for use with other suitable formats, for example based on the cyan, magenta, yellow, key (CMYK) or YUV colour formats.

The memory 102 holds a database of three-dimensional models of various known objects. In this example, the known objects are treated as rigid objects and the three-dimensional model stored for each known object is a computer aided design (CAD) model stored as a mesh representation. In the present example, a volumetric solid representation of each object is generated from the CAD model and stored alongside the CAD model. The solid representation of each object includes internal structure of the object in addition to the surface structure included for the mesh model. It is noted that for objects with complex internal structures, the internal structure of the stored solid representation does not necessarily correspond to the actual internal structure of the object, and may for example be simplified. Storing a solid model of each known object allows for points to be sampled from throughout the volume of the object, as opposed to just the surface, allowing for particularly effective implementation of pose refinement methods in accordance with aspects of the present disclosure. Nevertheless, the methods described herein can be adapted to be implemented using only mesh models, without departing from the scope of the invention.

The sensors 106 in the present example include a camera for capturing two-dimensional images of a scene and an infrared sensor for determining distances to objects in the scene (in other words, associated depth information).

Figure 2:
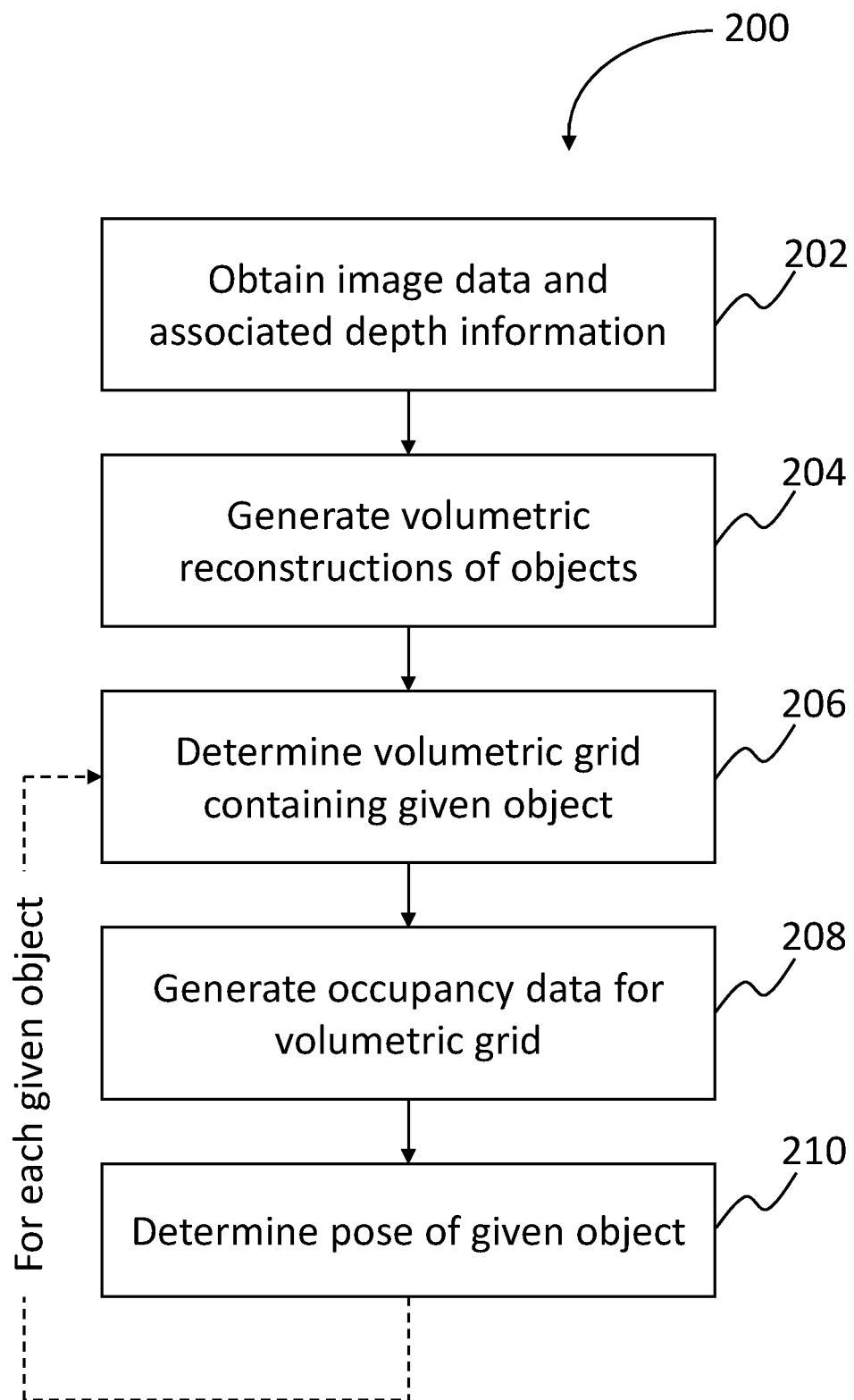
FIG. 2 is a flow diagram representing a method of estimating a pose of a target object in accordance with examples.

FIG. 2 shows an example of a computer-implemented method 200 performed by the system 100 for estimating a pose of a target object in a three-dimensional scene. The system 100 obtains, at 202, an image with associated depth information. The image represents a view of the three-dimensional scene, and the associated depth information specifies distances to different objects within the scene. In this example, the image and the associated depth information are captured using the sensors 106.

The three-dimensional scene contains multiple three-dimensional objects, at least one of which is a known object which the system 100 has been trained to recognise. In this example, the or each known object corresponds to an object model stored in the object model database in the memory 102. The scene may also include unknown objects which the system 100 has not been trained to recognise and which do not have corresponding object models stored in the memory 102. Typical examples of unknown objects include surfaces on which the known objects are positioned, along with objects which are not relevant to the specific task which the system 100 is being used to perform.

Figure 3:
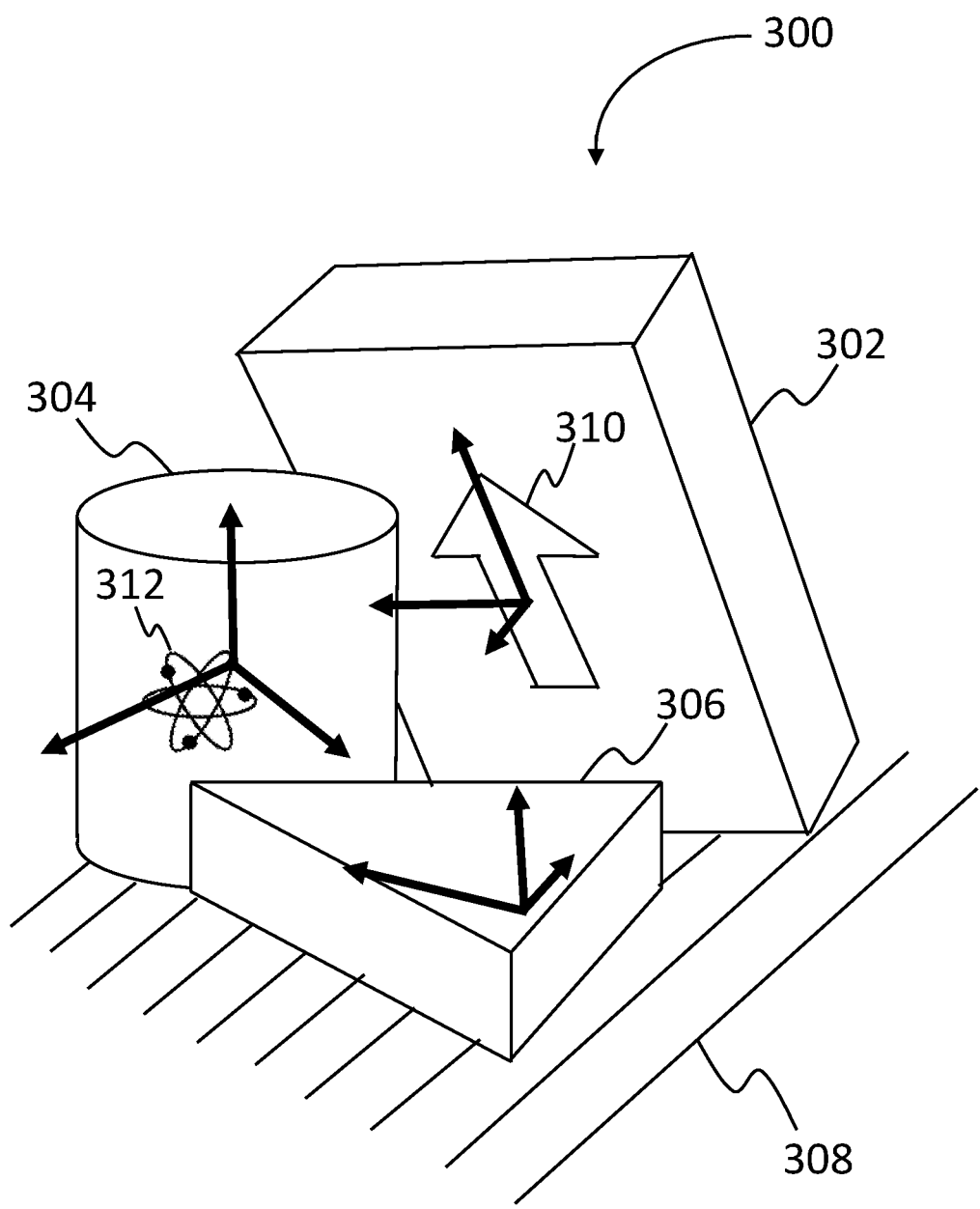
FIG. 3 shows an example of a three-dimensional scene comprising three known objects.

FIG. 3 shows a view of a three-dimensional scene 300. The scene 300 includes three known objects: a cuboid box 302; a cylindrical tin 304; and a prism 306 with a scalene triangular cross-section. Each known object has a three-dimensional shape and surface details including colours and textures (not shown), and in some cases including further surface decoration such as the arrow 310 on the box 302 and the symbol 312 on the tin 304. The scene 300 also includes a horizontal surface 308 on which the known objects are positioned. The horizontal surface 308 is an example of an unknown object.

The actual pose (position and orientation) of each known object in the scene 300 is represented in FIG. 3 by a respective set of three-dimensional axes. The pose is a six-dimensional quantity, with three of the dimensions defining the position of a predetermined point fixed in relation to the object with respect to a given co-ordinate system, and with the other three dimensions defining the orientation relative to the given co-ordinate system. In the present example, the position is defined using Cartesian co-ordinates and the orientation is defined using extrinsic Euler angles. Those skilled in the art will appreciate that other definitions are possible, for example using cylindrical or spherical polar co-ordinates for position, and/or using intrinsic Euler angles for orientation. As will be explained in more detail hereafter, the method 200 can be used to estimate the pose of any of the known objects in the scene 300.

In the example of FIG. 3, none of the known objects exhibits reflective symmetry in any plane, and therefore the pose of each known object can be defined uniquely with respect to a given co-ordinate system (note that symmetry of an object introduces ambiguity in the definition of the pose, an issue which is dealt with in certain embodiments as described hereinafter). In the present example, the tin 304 and the prism 306 are in upright orientations, each having one axis pointing vertically upwards and two axes lying in the horizontal plane. The box 302 is leaning on the tin 304 and is therefore not in an upright orientation.

Returning to FIG. 2, the system 100 processes, at 204, the image and the associated depth information to generate a volumetric map. The generated volumetric map is formed of volumetric reconstructions of the objects within the three-dimensional scene. The volumetric reconstruction of a given object includes voxels of the volumetric map corresponding to visible parts of the object in the image. From a single view of the scene, only certain parts each object are visible, and therefore only voxels corresponding to these parts will be included within the volumetric reconstruction of the object.

Figure 4:
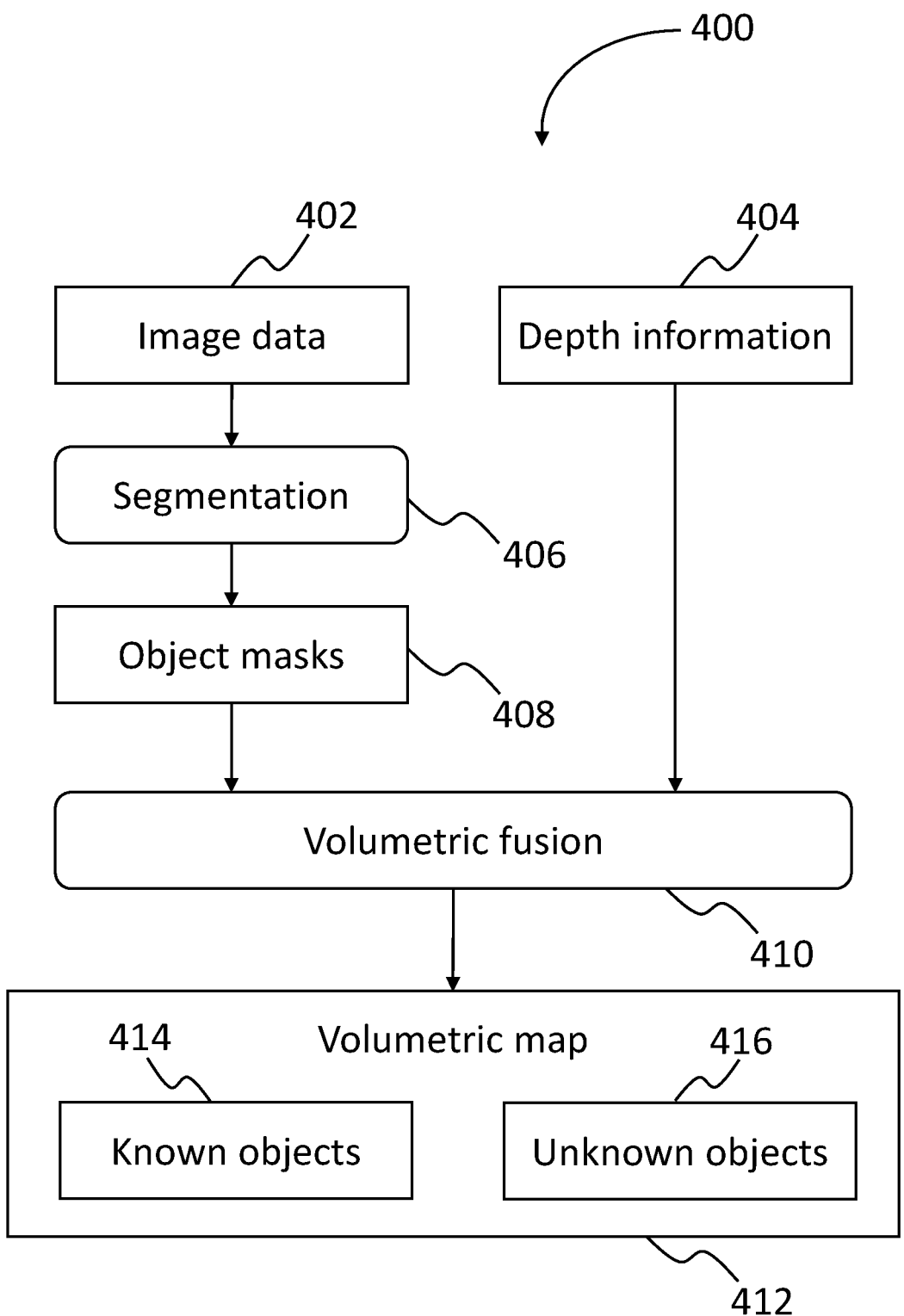
FIG. 4 shows schematically a data processing routine for generating a volumetric map of a scene in accordance with examples.

FIG. 4 shows an example of method 400 of processing an image 402 and associated depth information 404 representing a view of the three-dimensional scene to generate a volumetric map of the scene. The image 402 is processed at 406 using image segmentation to generate an object mask 408 for each of the known objects in the scene. The object mask 408 for a given object specifies a subset of the pixels of the image 402 in which a part of the object is visible. During image segmentation, the image is partitioned into regions corresponding to the respective different object masks for the known objects in the image, along with further regions representing unknown objects within the image. In the present example, image segmentation is performed using a deep CNN architecture as described in the article Mask R-CNN by Kaiming He et al, arXiv: 1703.06870. Other methods for image segmentation are known and compatible with the present disclosure.

The depth information 404 and the object masks 408 are processed together at 410 using volumetric fusion to generate a volumetric map 412. The volumetric map 412 includes a volumetric reconstruction 414 of each known object in the scene, and may further include volumetric reconstructions 416 of unknown objects in the scene. The depth information 404 is typically of lower resolution than the image 402, and the volumetric map 412 is typically also of lower resolution than the image 402.

Figure 5:
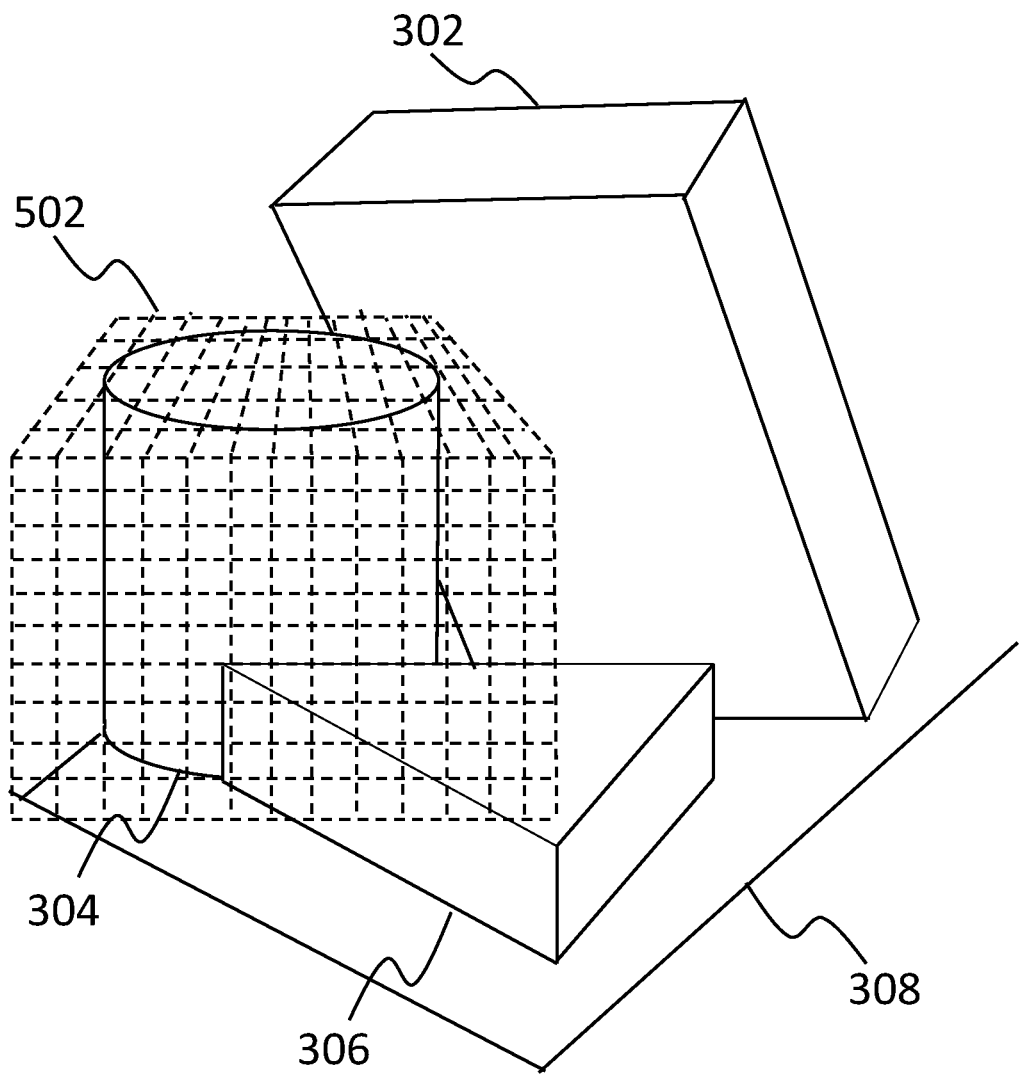
FIG. 5 shows an example of a voxel grid containing one of the known objects in the three-dimensional scene of FIG. 3

Returning to FIG. 2, the system 100 determines, at 206, a volumetric grid formed of a subset of the voxels of the volumetric map and containing the target object for which the pose is to be estimated. FIG. 5 shows an example in which a volumetric grid 502 contains the cylindrical tin 304 in the three-dimensional scene 300. In this example, the volumetric grid 502 is a cuboid which extends beyond the tin 304 in every direction. The dimensions of the volumetric grid generally depend on the dimensions of the target object. For example, a volumetric grid containing the prism 306 would have a reduced height compared with the volumetric grid 502 containing the tin 304. However, in order to simplify various subsequent processing steps, the number of voxels in the voxel grid for the target is fixed and independent of the dimensions of the target object (for example, 32×32×32 voxels), and the dimensions of the voxels themselves are varied to achieve different sizes and shapes of voxel grid. In order to do this, a voxel of the volumetric map can be divided into two or more smaller voxels, or two or more voxels of the volumetric map can be combined to form a single larger voxel.

The system 100 generates, at 208, occupancy data indicating portions of the volumetric grid which are occupied by free space or by objects other than the target object. Each of the voxels of the volumetric grid can be in any one of four states, depending on the occupancy of the voxel:

1. occupied by the volumetric reconstruction of the target object (e.g. the tin 304);
2. occupied by the volumetric reconstruction of one of other objects, including known objects (e.g. the box 302 and the prism 306) and unknown objects (e.g. the surface 308);
3. occupied by free space, as identified by depth measurement; or
4. unknown, because of occlusion and/or sensor range limit.

The voxels in states 2 and 3 are of particular interest for estimating the pose of the target object, as these voxels define an impenetrable region which cannot be occupied by any part of the target object. By indicating portions of the volumetric grid which are occupied by free space or by objects other than the target object, the occupancy data therefore includes information relevant for estimating the pose of the target object.

The system 100 estimates, at 210, the pose of the target object using the occupancy data generated at 208 and pointwise feature data for points on a visible portion of the target object. The pointwise feature data is derived from the pixels of image and can depend on all visual aspects of the target object, including the shape, surface details and any other information contained within the portion of the image containing the target object.

By combining the pointwise feature data for the target object with occupancy data for a voxel grid containing the target object, the estimated pose can be made dependent on detailed visual information relating to the target object itself, whilst also taking into account information relating to the surroundings of the target object. This results in improved accuracy of pose estimation compared with known pose estimation methods.

Figure 6A:
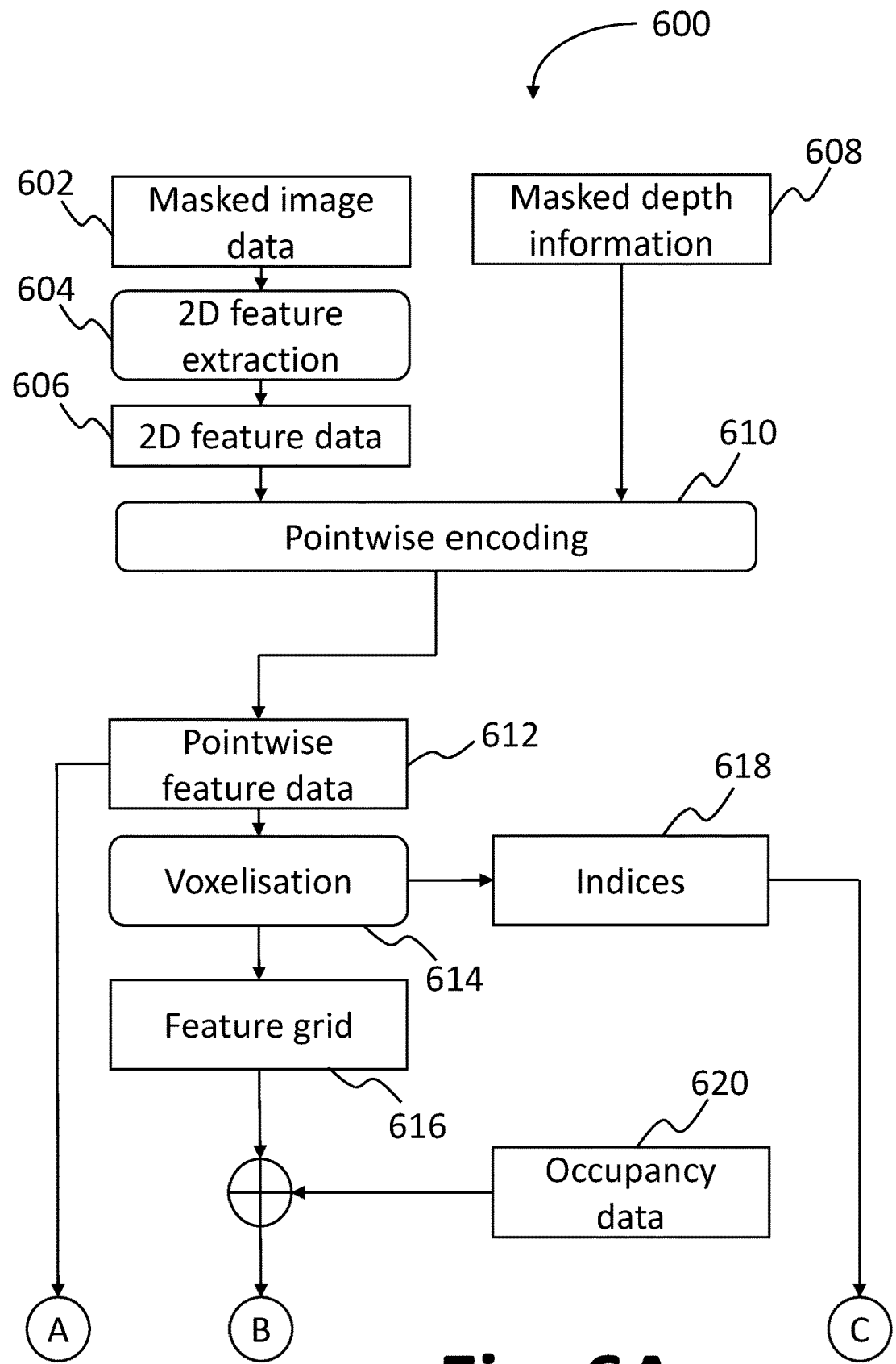
FIGS. 6A and 6B show schematically a data processing routine for estimating a pose of a target objects in accordance with examples.
Figure 6B:
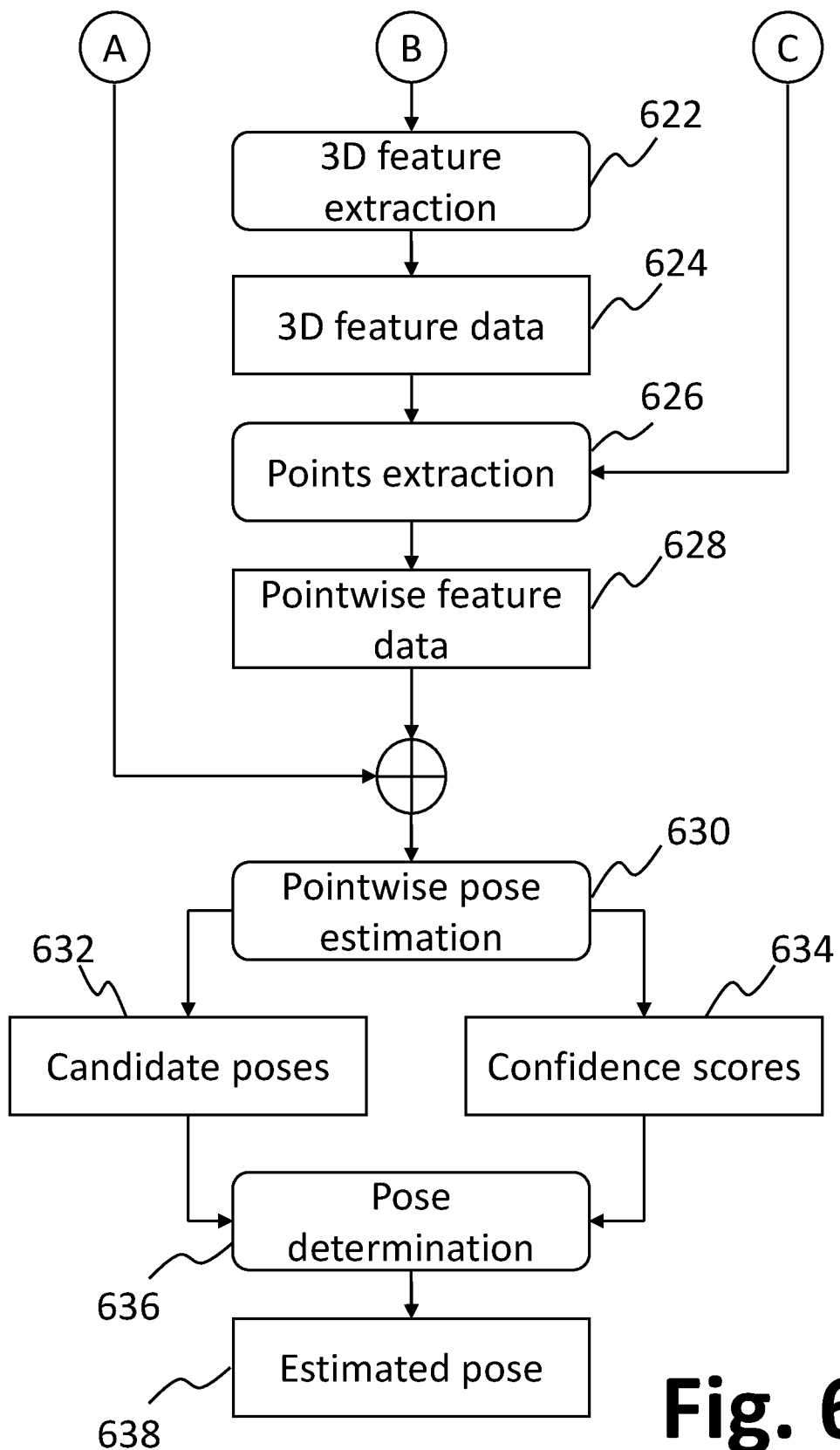

FIGS. 6A and 6B show an example of a method 600 for estimating a pose of a target object using occupancy data and pointwise feature data. Masked image data 602 is processed at 604 using two-dimensional feature extraction to generate two-dimensional feature data 606. The masked image data 602 contains a subset of the pixels of the image 402 contained within an object mask for the target object. In this example, the two-dimensional feature extraction is performed using a CNN. In order for the masked image data 602 to be used as an input for the CNN, the masked image data should have a fixed size and shape. In order to achieved this, pixel values for pixels outside of the object mask are set to a constant value (for example, zero). The use of masked image data means that the two-dimensional feature data 606 depends only on the target object itself, without any dependence on the surroundings of the target object. In this way, the dependence of the estimated pose on the surroundings is made to depend exclusively on occupancy data for a volumetric grid surrounding the target object, as will be explained in more detail hereafter.

The two-dimensional feature data 606 is processed, along with masked depth information 608, using pointwise encoding at 610, to generate pointwise feature data 612. The pointwise feature data 612 includes multiple feature channels for each of a set of three-dimensional points derived from the masked depth information 608. The points form a point cloud representing portions of the object visible in the image. In the present example, the two-dimensional feature data 606 and the masked depth information 608 are processed separately using respective fully connected neural network layers, and the resulting pointwise features are concatenated to generate the pointwise feature data 612.

The pointwise feature data 612 is processed at 614 using voxelisation, to generate a feature grid 616. The voxelisation (also known as voxelation) associates points specified in the pointwise feature data 612 with voxels of the voxel grid containing the target object (for example, the voxel grid 502 in FIG. 5). The voxel grid typically has a relatively low resolution (for example, 32×32×32 voxels) compared with the image and the associated depth data. The feature data for a given voxel is therefore derived from multiple points of the pointwise feature data 612, in this example by averaging, though in other examples the feature data for a given voxel is derived using other methods, for example by taking maximum values. Each voxel of the feature grid has an associated volumetric index specifying its location in the voxel grid, and these indices 618 are stored for subsequent processing.

The feature grid 616 is concatenated with occupancy data 620 indicating regions of the voxel grid which cannot be occupied by the target object because they are occupied by other objects or free space. The occupancy data 620 associates a binary number to each voxel of the voxel grid containing the target object, where the binary number indicates whether that voxel is impenetrable to the target object (i.e. whether the voxel is in either of states 2 or 3 referred to above). The concatenated feature grid 616 and occupancy data 620 therefore include, for each voxel of the voxel grid, a binary channel from the occupancy data 620 and multiple channels from the feature grid 616. The concatenated feature grid 616 and occupancy data 620 therefore contain information derived from the masked image data 602 and masked point cloud 610, and further contains information depending on the objects and space surrounding the target object.

The concatenated feature grid 616 and occupancy grid 620 are processed at 622 using three-dimensional feature extraction to generate three-dimensional feature data 624. In this example, the three-dimensional feature extraction is performed using a three-dimensional CNN having multiple stages each containing several convolutional layers. Each stage of the three-dimensional CNN generates a volumetric feature map, and after each stage a pooling or compression operation is performed to reduce the dimensionality of the volumetric feature map before processing by the next stage of the three-dimensional CNN. As a result, the three-dimensional CNN generates a hierarchy of volumetric feature maps at sequentially decreasing resolution. When the three-dimensional CNN is properly trained (as explained hereafter), the hierarchical features generated at different stages capture different latent information relevant to the estimated pose of the target object. The three-dimensional feature data 624 includes the volumetric feature maps generated at the different stages of the three-dimensional CNN. In the present example, the concatenated feature grid and occupancy grid contains 32×32×32 voxels, the three-dimensional CNN includes three stages, and the hierarchical volumetric feature maps contain 32×32×32, 16×16×16 and 8×8×8 voxels of features respectively.

It is noted that, in the present example, two-dimensional feature extraction from the masked image data 602 is performed independently of the three-dimensional feature extraction at 622. By performing two-dimensional feature extraction first, every pixel of the masked image data 602 contributes to the pointwise feature data 612, resulting in effective use of the information-rich masked image data without the computational cost becoming prohibitive. In other examples, image data is processed directly alongside occupancy data using a three-dimensional feature extractor. However, this approach usually requires a reduction in resolution of the image data in order to keep the required computational resources (processing power and memory) to a reasonable level. Therefore, information contained within the image data is lost.

Points extraction is performed at 626 to extract pointwise feature data 628 from the three-dimensional feature data 624, for points corresponding to the indices 618 stored during the voxelisation at 614. For each point corresponding to one of the indices 618, the corresponding features within the three-dimensional feature data 624 are extracted and stored. The pointwise feature data 628 therefore includes features for the same set of points as the pointwise feature data 612 derived from the masked image data 602 and the masked depth information 608. The pointwise feature data 612 and the pointwise feature data 628 are concatenated for the purpose of pointwise pose estimation.

It is noted that the pointwise feature data 612 depends strongly on the visual appearance and depth profile of the target object. The pointwise feature data 628 also has some dependence on the appearance and depth profile of the target object, but further depends on the surrounding space and objects. The inventor has found that using the pointwise feature data 612 strongly dependent on the visual appearance and depth profile of the target object, in combination with the surrounding occupancy data, results in a significant improvement of the accuracy of pose detection over known methods.

Pointwise pose estimation is performed at 630 using the concatenated pointwise feature data 612 and 628. In the present example, the pointwise pose estimation determines a candidate pose 632 and a candidate confidence score 634 for each of the points within the pointwise feature data 612 and 628. Each candidate pose 632 is a six-dimensional vector and the candidate confidence score 634 is a numerical value indicative of certainty that the corresponding candidate pose is correct. In this example, the pointwise pose estimation is performed using a fully connected neural network.

An estimated pose 638 is determined at 636 as a best of the candidate poses 632 on the basis of the confidence scores 634. In other words, the estimated pose 638 is determined as the candidate pose 632 having the highest confidence score 634.

Although in the example described above, pointwise pose estimation is used to determine a respective candidate pose for each of a set of points, in other examples pointwise feature data is processed to generate a single, global pose estimate, in which case there is no need for confidence scores to be determined.

The method 600 of FIG. 6 makes use of a series of trainable model components, namely the two-dimensional feature extractor used at 604, pointwise encoders used at 610, a three-dimensional feature extractor used at 622, and a pointwise pose estimator used at 630. In the present example, each of these components is a neural network model having a respective set of trainable parameters. Prior to the method 600 being performed, the models are trained using supervised learning with a labelled dataset of known objects with known ground truth poses. In the present example, the trainable models used in the pose estimation method 600 are trained independently of the image segmentation model used to generate the masked image data 602. In view of this, for the purpose of training the pose prediction models, labelled training data is generated by positioning and orienting volumetric models of known objects (in this example, CAD models of the known objects) to generate an artificial scene, for example using a physics model with collision detection. In this way, a large number of artificial scenes can be generated with perfectly segmented objects and known ground truth poses, without the time-consuming tasks of moving physical objects into position for the training of the model and manually determining the ground truth poses of the objects. Furthermore, the present approach using volumetric models allows the pose estimation models to be trained rapidly and in isolation from certain expensive physical components of the system 100, including the sensors 106 and the actuators 108. In order to train the pose estimation models, a set X of points is sampled (for example, uniformly) from a volumetric model of the target object. The positions of the points in X when transformed by the ground truth pose of the target object in the scene are compared with the positions of the points in X when transformed using each pointwise candidate pose estimate.

The models used in the pose estimation method 600 are trained using a single pose estimation loss L. At each of a set of training iterations, a gradient $\nabla_\theta L$ of the pose prediction loss is determined with respect to the trainable parameters $\theta$ of the pose prediction models using backpropagation, and the values of the trainable parameters $\theta$ are updated using gradient descent or a variant thereof to reduce the value of the pose estimation loss L. This updating is performed iteratively until predetermined stopping conditions are satisfied, which may correspond to predetermined convergence criteria being satisfied or a predetermined number of training iterations being performed.

In the present example, the pose estimation loss L is given by Equation (1):

$$L = \frac{1}{N}\sum_{i=1}^{N}(L_i c_i - \lambda \log(c_i)),\tag{1}$$

where:
N is the number of points for which candidate poses are estimated;
$c_i$ is the confidence score associated with the candidate pose of the $i^{th}$ point;
$\lambda$ is a scaling factor for a regularisation term $\log(c_i)$; and
$L_i$ is a pointwise pose estimation loss associated with the candidate pose determined for the $i^{th}$ point.

Appropriate values for have been found to be in the range E [0.01,0.1], and in particular in the range E [0.01,0.02], for example $\lambda$=0.015. The scaling factor can be tuned manually for a given training instance or can be included as a parameter to be learned during training. The pointwise pose estimation loss in this example is given by Equation (2):

$$L_i = \frac{1}{|X|}\sum_{q=1}^{|X|}\|(Rp_q + t) - (\hat{R}_i p_q + \hat{t}_i)\|,\tag{2}$$

where:
[R|t]$\in$ SE(3) is the ground truth pose of the target object, consisting of a 3×3 rotation matrix R$\in$ SO(3) and a translation vector t$\in \mathbb{R}^3$;
[$\hat{R}_i|\hat{t}_i$]$\in$ SE(3) denotes the candidate pose estimate for the $i^{th}$ point; and
$p_q$ is the position of the $q^{th}$ point of the set X of points sampled from the volumetric model of the target object.

The pointwise pose estimation loss of Equation (2) is appropriate for objects which do not exhibit reflective symmetry in any plane. For symmetric objects, an ambiguity arises as to which point transformed by the ground truth pose should be compared with a point transformed by a given candidate pose estimate. For such objects, a modified pointwise pose estimation loss is used, as given by Equation (3):

$$L_i = \frac{1}{|X|}\sum_{q=1}^{|X|}\min_{p_{q'}\in X}\|(Rp_q + t) - (\hat{R}_i p_{q'} + \hat{t}_i)\|,\tag{3}$$

which effectively results in the nearest point after transformation by the candidate pose estimate being compared with a given point transformed by the ground truth pose. In a specific configuration, a first training stage is performed using the unmodified pointwise training loss of Equation (2), followed by a second training stage using the modified pointwise training loss of Equation (3). This has been found by the inventor to avoid local minima which can sometimes result from use of the modified pointwise pose loss, whilst avoiding erroneous pose estimations which would result form the use of the unmodified pointwise training loss for symmetric objects. This results in particularly good performance of the pose estimation method for symmetric objects with complicated shapes.

The method 200 of FIG. 2 can be used to estimate poses of multiple objects in a given scene, with the estimated pose for each given object taking into account the occupancy of a region of space surrounding the given object. In some examples, the estimated poses are sufficiently accurate to be used for a given purpose. In other examples, it cannot be guaranteed that pose estimates determined using the method 200, or any other pose estimation routine, are accurate enough for a given purpose. In such cases, there is a need for a method of refining pose estimates, at the expense of some additional computing cost and time.

Figure 7:
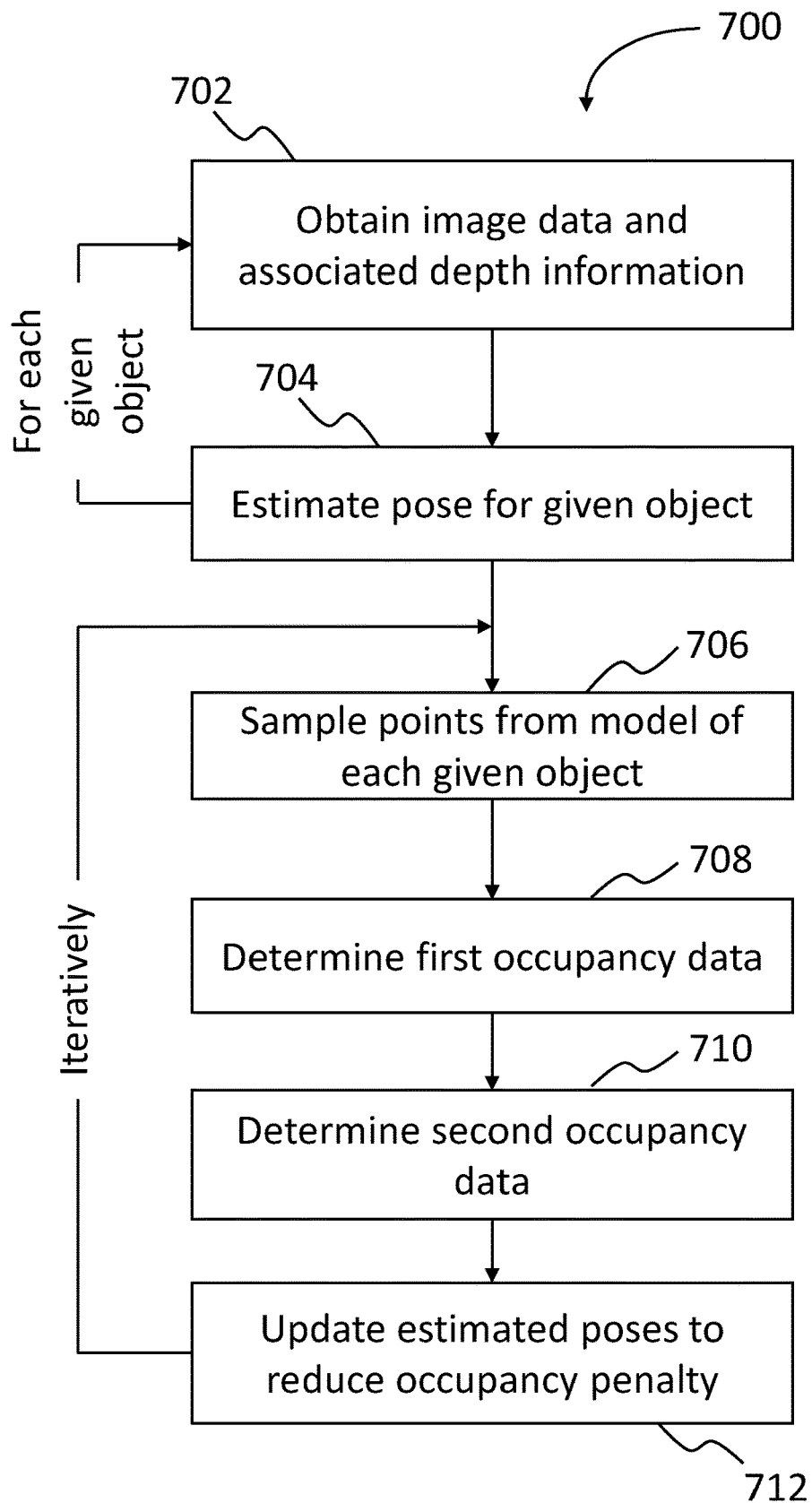
FIG. 7 is a flow diagram representing a method of refining pose estimates for multiple objects in accordance with an example.

FIG. 7 shows an example of a computer-implemented method 700 performed by the system 100 for estimating a pose of each of a plurality of known objects in a three-dimensional scene. For each given object of the plurality of known objects, the system 100 obtains, at 702, image data and associated depth information representing a view of a three-dimensional scene in which at least a part of the given object is visible (the given object may be partially occluded or extending beyond the boundary of the image), and estimates, at 704, a pose for the given object. In the present example, the image and associated depth information is captured using the sensors 106 and the pose of each object is estimated using the method 200 of FIG. 2. Alternatively, any other suitable pose prediction methods could be used. In some examples, poses of the several objects in the scene are estimated using a single image and associated depth information. In other examples, poses of two or more different objects are estimated using different images representing different views of the three-dimensional scene. In the latter case, the estimated pose of each given object is transformed to a common reference frame (for example, using information indicative of the position and orientation of the sensors 106 when capturing the image and associated depth information).

Having determined an estimate for the pose of each of the plurality of objects, and transformed the estimated poses to a common reference frame if necessary, the system 100 performs an iterative pose refinement routine to jointly optimise the estimated poses as described hereafter. The pose refinement routine starts at 706, where the system 100 samples a set of points from a stored model of each given object, transformed in accordance with the corresponding estimated pose of the object. In this example, the stored model is a volumetric solid model and the system 100 samples the set of points uniformly from throughout the volume of the volumetric solid model. The sampled set of points for each given object forms a point cloud.

The system 100 determines, at 708, respective first occupancy data for each given object dependent on positions of the points sampled from the stored model of the given object, relative to a voxel grid containing the given object. In the present example, where the system 100 uses the method 200 to determine the initial pose estimates, the system 100 has already determined a voxel grid containing each given object. The same voxel grid is therefore reused for defining the first occupancy data. In other examples, such as when the method 200 is not used to determine the initial pose estimates, a new voxel grid is determined for each given object at 708.

The first occupancy data for a given object depends on points with locations depending on the estimated pose of the given object, relative to a voxel grid containing the given object. The positions of the points are therefore differentiable with respect to the pose of the given object. In other words, a small change in the estimated pose of the given object leads to a predictable small change in the position of each sampled point. Provided that the first occupancy data depends on the positions of the points in a smooth, differentiable manner, the first occupancy data is therefore also differentiable with respect to the estimated pose of the given object.

The system 100 determines, at 710, respective second occupancy data for each given object dependent on positions of the points sampled from the stored models of the other objects of the plurality of objects, relative to the voxel grid containing the given object. The second occupancy data for a given object is differentiable with respect to the estimated poses of the other objects in the same way that the first occupancy data is differentiable with respect to the estimated pose of the given object.

The system 100 updates, at 712, the estimated poses of the plurality of objects to reduce an occupancy penalty depending on the respective first occupancy data and the respective second occupancy data for each of the plurality of objects. The occupancy penalty depends on the first occupancy data and the second occupancy data in a differentiable manner, and in turn is therefore differentiable with respect to the estimated poses of the plurality of objects. This allows a gradient of the occupancy penalty to be determined with respect to the estimated poses of the plurality of objects, which in turns allows for incremental updating of the estimated poses using gradient descent of a variant thereof.

The steps 706-712 are performed iteratively until a stopping condition is satisfied. The stopping condition may include predetermined convergence criteria being satisfied, or may include a predetermined number of iterations having been performed.

In a specific example, the first occupancy data includes a first differentiable occupancy grid for each given object of the plurality of objects. The first differentiable occupancy grid $g_m^{given}$ for the $m^{th}$ object consists of a first differentiable occupancy value for each voxel of the voxel grid containing the $m^{th}$ object. The first differentiable occupancy value $o_k^m$ for the $k^{th}$ voxel depends on a minimum distance between the $k^{th}$ voxel and the points sampled from the volumetric model of the given object, as shown by Equation (4):

$$o_k^m = 1 - \min\left(\delta^t, \min_q(\delta_{qk}^{mm})\right), \quad (4)$$

where $\delta_{qk}^{mm}$ is the distance between the $k^{th}$ voxel of the voxel grid containing the $m^{th}$ and the $q^{th}$ point sampled from the volumetric model of the $m^{th}$ object, and $\delta^t$ is a predetermined distance threshold. In the present example, the dependence on the minimum distance $\min \delta_{qk}^{mm}$ saturates at the distance threshold, so that if no point is closer to the voxel than the distance threshold, the occupancy for that voxel is set to 0 and that voxel does not contribute to the occupancy penalty. Once any point is brought closer to the voxel than the predetermined distance threshold, the differentiable occupancy increases continuously, reaching a maximum value of 1 if the point coincides with the voxel. In order to calculate the distances $\delta_{qk}^{mm}$, the position $p_q^m$ of the $q^{th}$ point sampled from the model of the $m^{th}$ object is transformed to the co-ordinate system of the voxel grid using the equation $u_q^m = (p_q^m - l)/s$, where $l$ is an origin of the voxel grid coordinate system and $s$ is the size of each voxel in the voxel grid. The distances are then given by $\delta_{qk}^{mm} = |u_q^m - v_k^m|$, where $v_k^m$ is a position associated with the $k^{th}$ voxel (for example, a predetermined corner of the voxel or the centre of the voxel), and $u_q^m$ is the position of the point in the voxel coordinate system.

In this example, the second occupancy data includes a second differentiable occupancy grid for each given object of the plurality of given objects. The second occupancy grid $g_m^{other}$ for the $m^{th}$ object consists of a second differentiable occupancy value for each voxel of the voxel grid containing the $m^{th}$ object. The second differentiable occupancy value $\tilde{o}_k^m$ for the $k^{th}$ voxel depends on a minimum distance between the $k^{th}$ voxel and the points sampled from the volumetric models of all of the other given objects, as shown by Equation (5):

$$\tilde{o}_k^m = 1 - \min\left(\delta^t, \min_{q,n}(\delta_{qk}^{mn})\right), \quad (5)$$

where $\delta_{qk}^{mn}$ is the distance between the $k^{th}$ voxel of the voxel grid containing the $m^{th}$ object and the $q^{th}$ point sampled from the volumetric model of the $n^{th}$ object (where $n \neq m$). In order to determine the distances $\delta_{qk}^{mn} = |u_q^n - v_k^m|$, the points sampled from the models of the other objects are transformed to the co-ordinate system of the voxel grid containing the $m^{th}$ object.

In the present example, the occupancy penalty $L^o$ includes, for each given object of the plurality of known objects, a collision component $L_m^{o+}$ which increases when a point sampled from the predetermined model of the given object and a point sampled from the predetermined model of a different object of the plurality of known objects are simultaneously brought closer to a voxel of the voxel grid containing the given object. The collision component $L_m^{o+}$ in this example is derived from the first differentiable occupancy grid $g_m^{given}$ and the second differentiable occupancy grid $g_m^{other}$ as shown by Equation (6):

$$L_m^{o+} = \frac{\left(g_m^{given} \circ g_m^{other}\right)}{\sum_k o_k^m}, \quad (6)$$

where $\circ$ denotes the elementwise product. The collision component $L_m^{o+}$ penalises situations where a voxel of the voxel grid containing the $m^{th}$ object is simultaneously close to a point sampled from the $m^{th}$ object and a point sampled from one of the other objects of the plurality of known objects. A possible definition of the overall occupancy penalty is then given by $L^o = \Sigma_m L_m^{o+}/N$, where the sum is over the N known objects. The overall occupancy penalty is optimised jointly with respect to the estimated poses of all of the known objects. More sophisticated definitions of the occupancy penalty are possible, however, as will be explained hereafter.

In some examples, such as those in which the method 200 of FIG. 2 is used to determine the initial pose estimates, volumetric reconstructions are generated for each given object of the plurality of known objects, additional occupancy data is generated from volumetric fusion. This additional occupancy data indicates portions of the voxel grid containing the given object which are occupied by free space and portions of the voxel grid containing the given object which are occupied by objects other than the given object. Unlike the first occupancy data and the second occupancy data, this additional occupancy data is not differentiable with respect to the estimated poses of the objects. The additional occupancy data does, however, contain information which is relevant for pose refinement, because the additional occupancy data defines an impenetrable region of the voxel grid containing the given object. Given this information, the collision component for a given object can be modified to increase when a point sampled from the predetermined model of the given object is brought closer to a voxel of the voxel grid containing the given object which is occupied by free space or by objects other than the given object In one example, the additional occupancy data includes a binary impenetrable grid $g_m^{inpen}$ which associates a binary number to each voxel of the voxel grid containing the given object, where the binary number indicates whether that voxel is impenetrable to the given object (i.e. whether the voxel is in either of states 2 or 3 referred to above). For compatibility with the definitions of the first differentiable occupancy grid $g_m^{given}$ and the second differentiable occupancy grid $g_m^{other}$, the impenetrable grid $g_m^{inpen}$ is given a value of 1 for impenetrable voxels, and 0 otherwise. It will be appreciated that other definitions are possible, however.

Given the impenetrable grid $g_m^{inpen}$, an alternative definition of the collision component for the $m^{th}$ given object is given by Equation (7):

$$L_m^{o+} = \frac{\left(g_m^{given} \circ \max\left(g_m^{other}, g_m^{inpen}\right)\right)}{\sum_k o_k^m}, \quad (7)$$

where the maximum operator is taken elementwise. This alternative definition penalises situations where a voxel of the voxel grid containing the $m^{th}$ object is close to a point sampled from the $m^{th}$ object and is simultaneously close to a point which is sampled from one of the other known objects, and/or which is part of the impenetrable grid. The alternative definition of the collision component can result in improved performance of the pose refinement method, because the resulting set of poses is constrained by impenetrable regions of the volumetric map of the scene.

In addition to a collision component, defined for example by Equation (6) or Equation (7), the occupancy penalty can be augmented to include a surface alignment component for each of the plurality of known objects. Unlike the collision component, which penalises overlapping of neighbouring objects, the surface alignment component rewards situations where points sampled from a given object overlap with voxels of the volumetric reconstruction for that object. The surface alignment component therefore encourages consistency between the estimated pose of the given object and the appearance of the given object in the image and associated depth information.

In an example, the surface alignment component for the $m^{th}$ given object is given by Equation (8):

$$L_m^{o-} = -\frac{\left(g_m^{given} \circ g_m^{self}\right)}{\sum_k o_k^{m,self}}, \quad (8)$$

where $g_m^{self}$ is a binary self-occupancy grid with elements given by $o_k^{m,self}$, where in this example $o_k^{m,self}$ has a value of 1 for voxels occupied by the volumetric reconstruction of the $m^{th}$ object, and 0 otherwise. The surface alignment component for a given object decreases when a point sampled from the predetermined model of the given object is brought closer to a voxel of the voxel grid containing the given object which is occupied by the volumetric reconstruction for the given object.

When a surface alignment component is included, the occupancy penalty is defined by Equation (9):

$$L_m^o = \frac{1}{N}\sum_{m=1}^{N}(L_m^{o+} + L_m^{o-}). \quad (9)$$

The occupancy penalty is optimised jointly with respect to the estimated poses of all of the known objects. In one example, the optimisation is performed using batch gradient descent on a graphics processing unit (GPU).

Figure 8:
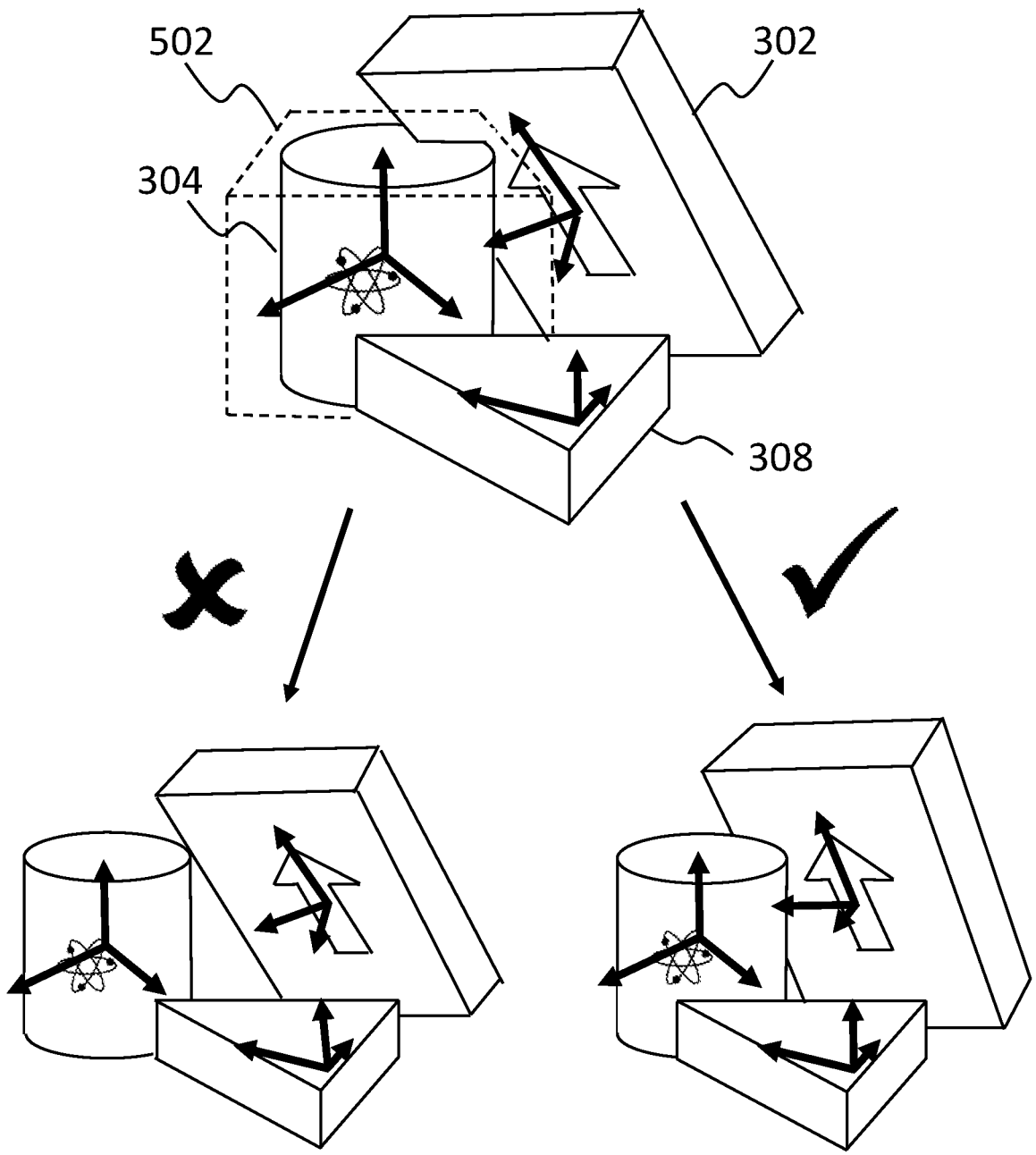
FIG. 8 shows an example of refinement of pose estimates for the known objects in the three-dimensional scene of FIG. 3.

FIG. 8 illustrates the effect of including a surface alignment component in the occupancy penalty. The top frame shows an initial set of estimated poses for the known objects 302, 304, 306 in the scene 300 of FIG. 3, in this example determined using the method 200 of FIG. 2. It is observed that the estimated poses are inaccurate, resulting in the box 302 intersecting with the tin 304. As a result, the collision component for the tin 304 (defined using the voxel grid 502) has a high value. The lower frame on the left shows the estimated poses of the objects 302, 304, 306 after pose refinement has been performed without the use of a surface alignment component. It is observed that the tin 304 has moved to the left such that there is no longer an overlap with the box 302, in order to reduce the collision component for the tin 304. However, the resulting scene does not correspond closely with the actual scene 300 shown in FIG. 3. The lower frame on the right shows the estimated poses of the objects 302, 305, 306 after pose refinement has been performed using a surface alignment component. It is observed that the angle of the box 302 has been modified such that there is no longer an overlap with the tin 304, in order to reduce the collision component of the occupancy penalty. However, in contrast with the erroneous scene in the lower left frame, the resulting scene in the lower right frame corresponds closely with the scene 300 in FIG. 3, because the surface alignment component for the tin 304 has prevented the tin 304 from moving away from its original position in a way which is inconsistent with its volumetric reconstruction. The surface alignment component thereby results in more accurate pose prediction.

Using the methods 200 and/or 700, the system 100 is able to predict a first pose for an object in a scene using an image and associated depth information representing a first view of the scene captured by the sensors 106. However, the entirety of the object will not be visible from any single view of the scene. In order to achieve even more accurate pose prediction, in the present example the system 100 is further configured to move the sensors 106 using the actuators 108 to capture a further image and associated depth information representing a second view of the scene. The second view is different from the first view because the sensors 106 have a different orientation and/or position relative to the scene after being moved.

Using the further image and associated depth information, the system 100 predicts a second pose for the object. In the present example, the second pose is predicted using the same method as the first pose, namely the pose estimation method 200 followed by the pose refinement method 700. At least one of the first pose and the second pose is transformed such that the first pose and the second pose are expressed with respect to a common coordinate system. In the present example, both the first pose and the second pose are transformed to an arbitrary "world" coordinate system which is independent of the position and orientation of the sensors 106.

Transforming the first pose and/or the second pose to a common coordinate system allows the first pose and the second pose to be compared. If, on the basis of this comparison, a consistency condition is determined to be met, the first pose and second pose are determined to be accurate. If the consistency condition is not determined to be met, a further image and associated depth information is captured representing a third view of the scene, which is then compared with each of the first pose and the second pose. If the third pose is consistent with either the first pose or the second pose, then that pose is determined to be accurate. Further images and associated depth information are captured, and further poses predicted for the object, until the consistency condition is satisfied. In the present example, the poses are compared using the pointwise pose estimation loss of Equation (2), and the consistency condition is satisfied when any two predicted poses with a pointwise pose estimation loss of less than a threshold value. In other examples, the consistency condition is satisfied when a threshold number M of predicted poses have a pointwise pose estimation loss $L_i$ of less than a threshold value $L^t$, i.e. when $M=\text{count}(L_i < L^t)$.

If a pose prediction is determined to be accurate on the basis of pose comparisons as described above, the system 100 spawns a mesh model of the object transformed consistently with the predicted pose. By spawning mesh models of multiple known objects, a mesh model of the scene is generated. The mesh model of the scene can be used for interacting with the scene (as described in more detail hereafter), or can be displayed for a human user.

It is noted that, during the process of capturing different views of the scene and making further pose predictions, the volumetric map of the scene can be built up iteratively using information from the different view, with the volumetric reconstruction of the objects containing fewer and fewer voxels in the "unknown" state. As a result, later pose predictions (which use information from multiple views) are likely to be more accurate than the initial pose predictions (which only use information from a single view). However, capturing multiple views of the scene takes additional time. Therefore, a trade-off arises between accuracy and time. In some cases, it is essential that pose prediction is performed quickly, in which case it may be necessary to predict the poses of a given object from only a single view of a scene. Examples include pose prediction performed by an ADS or ADAS in a vehicle. In other cases, accuracy is of paramount importance. Examples of such cases include very intricate robotics tasks.

The methods described herein are particularly valuable for robotics tasks in which a robot is used to pick up or otherwise engage objects. Such a robot includes one or more engaging means such as robotic hands or other components for grabbing, pushing, or otherwise physically contacting a given object. In order to correctly engage the given object, the robot first predicts the pose of the given object and then engages the given object in dependence on the predicted pose. In some examples, the robot first spawns a mesh model of the given object (for example, a CAD model) transformed in accordance with the predicted pose of the given object, and engages the given object on the basis of the spawned mesh model.

In further examples, a robot can interact with a given object without directly contacting the given object, for example using suction means or blowing means, lasers or other radiation sources, or any other components appropriate to the task performed by the robot.

The system 100 of FIG. 1 can be implemented as a standalone device or as a distributed computing system. Although the system 100 includes sensors 106 for capturing images and associated depth information, in other examples a data processing system can be arranged to perform the methods described herein images and associated depth information received from a remote source, in which case sensors are not necessary. In other examples, one or more other types of sensor may be included in addition to, or instead of, the sensors 106. Examples of suitable sensors are stereoscopic cameras, event cameras, infrared cameras, and/or transceivers for sound navigation ranging (sonar).

The processing circuitry 104 of the system 100 includes various processing units including a central processing unit (CPU) and a graphics processing unit (GPU). In other examples, specialist processing units, such as application specific integrated circuits (ASICs) or digital signal processors (DSPs), are provided to perform specific processing operations. In some examples, a specialist neural network accelerator (NNA) or neural processing unit (NPU) is provided for efficiently performing neural network operations. In some examples, a semiconductor device is provided with one or more gate arrays configured to perform specific operations required for the implementation of the methods described herein.

The memory circuitry 102 of the system 100 includes non-volatile storage in the form of a solid-state drive (SSD), along with volatile random-access memory (RAM), in particular static random-access memory (SRAM) and dynamic random-access memory (DRAM). In other examples, alternative types of memory can be included, such as removable storage, flash memory, synchronous DRAM, and so on.

The pose estimation method 200 of FIG. 2 or the pose refinement method 700 of FIG. 7 can be performed independently of one another. Accordingly, in some examples, a system is configured to perform the method 200 without any further refinement. In such examples, it is not necessary to store volumetric models of each known object, though it is still necessary to provide a trained neural network or other component to recognise the known objects for image segmentation. In other examples, an alternative pose estimation method can be performed in conjunction with the pose refinement method 700.

The above embodiments are to be understood as illustrative examples of the invention. Further embodiments of the invention are envisaged. For example, the pose prediction methods described herein can be combined with physics reasoning to ensure that the resulting pose predictions are physically possible/realistic. Such reasoning can be incorporated using a physics engine, such as are well known in the context of video games. In some examples, physics reasoning is used in addition to, or as an alternative to, collision-based methods for pose refinement.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of determining a pose of each of a plurality of objects in a three-dimensional environment, the method comprising, using one or more processors:
for each given object of the plurality of objects:
obtaining image data and associated depth information representing a view of the three-dimensional environment in which at least a part of the given object is visible; and
processing the image data and the associated depth information to estimate a pose of the given object; and
iteratively updating the estimated poses of the plurality of objects, wherein the updating comprises:
sampling, for each given object of the plurality of objects, a plurality of points from a predetermined model of the given object transformed in accordance with the estimated pose of the given object;
determining respective first occupancy data for each given object of the plurality of objects dependent on positions of the points sampled from the predetermined model of the given object, relative to a voxel grid containing the given object, the first occupancy data for the given object being dependent on minimum distances between voxels of the voxel grid containing the given object and the points sampled from the predetermined model of the given object;
determining respective second occupancy data for each given object of the plurality of objects dependent on positions of the points sampled from the predetermined models of the other objects of the plurality of objects, relative to the voxel grid containing the given object, the second occupancy data for the given object being dependent on minimum distances between voxels of the voxel grid containing the given object and the points sampled from the predetermined models of the other objects of the plurality of objects; and
updating the estimated poses of the plurality of objects to reduce an occupancy penalty depending on the respective first occupancy data and the respective second occupancy data for each of the plurality of objects,
wherein the occupancy penalty comprises a collision component for each given object of the plurality of object which increases when a point sampled from the predetermined model of the given object and a point sampled from the predetermined model of a different object are simultaneously brought closer to a voxel of the voxel grid containing the given object.

2. The method of claim 1, wherein updating the estimated poses of the plurality of objects comprises:
determining a gradient of the occupancy penalty with respect to the estimated poses of the plurality of objects; and
updating the estimated poses of the plurality of objects using the determined gradient of the occupancy penalty.

3. The method of claim 1, wherein the dependences on the minimum distances saturate at a predetermined distance threshold.

4. The method of claim 1, comprising processing the image data and the associated depth information to generate a volumetric reconstruction for each given object of the plurality of objects.

5. The method of claim 4, comprising generating, using the generated volumetric reconstructions, third occupancy data indicating portions of the voxel grid containing the given object which are occupied by free space and portions of the voxel grid containing the given object which are occupied by objects other than the given object.

6. The method of claim 5, wherein the occupancy penalty comprises a collision component for each given object of the plurality of objects which increases when a point sampled from the predetermined model of the given object is brought closer to a voxel of the voxel grid containing the given object which is occupied by free space or by objects other than the given object.

7. The method of claim 5, wherein estimating the pose of each given object comprises determining the estimated pose of the given object using the generated third occupancy data and pointwise feature data for a plurality of points on the surface of the given object.

8. The method of claim 4, wherein the occupancy penalty comprises a surface alignment component for each given object of the plurality of objects which decreases when a point sampled from the predetermined model of the given object is brought closer to a voxel of the voxel grid containing the given object which is occupied by the volumetric reconstruction for the given object.

9. The method of claim 1, wherein:
the view of the three-dimensional environment is a first view of the three-dimensional environment; and the determined pose of each given object is a first pose of the given object, the method comprising:

obtaining further image data and further associated depth information representing a second view of the three-dimensional environment different to the first view of the three-dimensional environment; and for each given object of the plurality of objects:
processing the further image data and the further associated depth information to determine a second pose for the given object;
transforming at least one of the first pose and the second pose of the given object to determine pose comparison data;
processing the pose comparison data to determine whether a consistency condition is met; and
when the consistency condition is determined to be met, generating a predetermined object model for the given object transformed consistently with the first pose and the second pose of the given object.

10. The method of claim 1, comprising generating the predetermined model of each given object of the plurality of objects from a respective computer-aided design (CAD) model.

11. A system comprising:

one or more processors; and one or more non-transitory storage media comprising instructions which, when executed by the one or more processors, cause the one or more processors to carry out operations comprising:

for each given object of a plurality of objects in a three-dimensional environment:
obtaining image data and associated depth information representing a view of the three-dimensional environment in which at least a part of the given object is visible; and
processing the image data and the associated depth information to estimate a pose of the given object; and iteratively updating the estimated poses of the plurality of objects, wherein the updating comprises:
sampling, for each given object of the plurality of objects, a plurality of points from a predetermined model of the given object transformed in accordance with the estimated pose of the given object;
determining respective first occupancy data for each given object of the plurality of objects dependent on positions of the points sampled from the predetermined model of the given object, relative to a voxel grid containing the given object, the first occupancy data for the given object being dependent on minimum distances between voxels of the voxel grid containing the given object and the points sampled from the predetermined model of the given object;
determining respective second occupancy data for each given object of the plurality of objects dependent on positions of the points sampled from the predetermined models of the other objects of the plurality of objects, relative to the voxel grid containing the given object, the second occupancy data for the given object being dependent on minimum distances between voxels of the voxel grid containing the given object and the points sampled from the predetermined models of the other objects of the plurality of objects; and
updating the estimated poses of the plurality of objects to reduce an occupancy penalty depending on the respective first occupancy data and the respective second occupancy data for each of the plurality of objects,
wherein the occupancy penalty comprises a collision component for each given object of the plurality of object which increases when a point sampled from the predetermined model of the given object and a point sampled from the predetermined model of a different object are simultaneously brought closer to a voxel of the voxel grid containing the given object.

12. The system of claim 11, wherein updating the estimated poses of the plurality of objects comprises:
determining a gradient of the occupancy penalty with respect to the estimated poses of the plurality of objects; and
updating the estimated poses of the plurality of objects using the determined gradient of the occupancy penalty.

13. The system of claim 11, wherein for each given object of the plurality of objects:
the first occupancy data for the given object is dependent on minimum distances between voxels of the voxel grid containing the given object and the points sampled from the predetermined model of the given object; and
the second occupancy data for the given object is dependent on minimum distances between voxels of the voxel grid containing the given object and the points sampled from the predetermined models of the other objects of the plurality of objects.

14. The system of claim 11, wherein the operations further comprise processing the image data and the associated depth information to generate a volumetric reconstruction for each given object of the plurality of objects.

15. The system of claim 11, further comprising engaging means for engaging a given object of the plurality of objects in dependence on the determined pose of the given object.

16. The system of claim 11, further comprising one or more sensors configured to capture the image data and the associated depth information.

17. The system of claim 16, further comprising one or more actuators configured to move the one or more sensors, wherein:
the view of the three-dimensional environment is a first view of the three-dimensional environment;
the determined pose of each given object is a first pose of the given object; and the operations further comprise:
moving the one or more sensors using the one or more actuators;
capturing further image data and further associated depth information representing a second view of the three-dimensional environment resulting from the moving of the one or more sensors; and
for each given object of the plurality of objects:
processing the further image data and the further associated depth information to determine a second pose for the given object;
transforming at least one of the first pose and the second pose of the given object to determine pose comparison data;
processing the pose comparison data to determine whether a consistency condition is met; and
when the consistency condition is determined to be met, generating a predetermined object model for the given object transformed consistently with the first pose and the second pose of the given object.

18. A non-transitory storage medium comprising instructions which, when executed by one or more processors, cause the one or more processors to carry out operations comprising:

for each given object of a plurality of objects in a three-dimensional environment:
obtaining image data and associated depth information representing a view of the three-dimensional environment in which at least a part of the given object is visible; and
processing the image data and the associated depth information to estimate a pose of the given object; and iteratively updating the estimated poses of the plurality of objects, wherein the updating comprises:
sampling, for each given object of the plurality of objects, a plurality of points from a predetermined model of the given object transformed in accordance with the estimated pose of the given object;
determining respective first occupancy data for each given object of the plurality of objects dependent on positions of the points sampled from the predetermined model of the given object, relative to a voxel grid containing the given object, the first occupancy data for the given object being dependent on minimum distances between voxels of the voxel grid containing the given object and the points sampled from the predetermined model of the given object;
determining respective second occupancy data for each given object of the plurality of objects dependent on positions of the points sampled from the predetermined models of the other objects of the plurality of objects, relative to the voxel grid containing the given object, the second occupancy data for the given object being dependent on minimum distances between voxels of the voxel grid containing the given object and the points sampled from the predetermined models of the other objects of the plurality of objects; and
updating the estimated poses of the plurality of objects to reduce an occupancy penalty depending on the respective first occupancy data and the respective second occupancy data for each of the plurality of objects, wherein the occupancy penalty comprises a collision component for each given object of the plurality of object which increases when a point sampled from the predetermined model of the given object and a point sampled from the predetermined model of a different object are simultaneously brought closer to a voxel of the voxel grid containing the given object.

* * * * *